US005680115A

United States Patent [19]

Sim

[11] Patent Number: 5,680,115

[45] Date of Patent: Oct. 21, 1997

[54] REMOTE CONTROLLING METHOD

[75] Inventor: Sun-seon Sim, Suwon, Rep. of Korea

[73] Assignee: Samsung Electronics Co., Ltd., Kyungki-Do, Rep. of Korea

[21] Appl. No.: 863,122

[22] Filed: Apr. 3, 1992

[30] Foreign Application Priority Data

Jun. 19, 1991 [KR] Rep. of Korea ........................ 91-10322

[51] Int. Cl.[6] ........................................................ H04J 5/44

[52] U.S. Cl. ................................ 340/825.72; 340/825.69; 348/734; 359/145; 359/146; 359/148

[58] Field of Search ......................... 340/825.29, 825.72; 358/194.1; 359/142, 145, 146, 148

[56] References Cited

U.S. PATENT DOCUMENTS

| | | | |
|---|---|---|---|
| 4,626,848 | 12/1986 | Ehlers | 340/825.69 |
| 4,703,359 | 10/1987 | Rumbolt et al. | 340/825.72 |
| 4,774,511 | 9/1988 | Rumbol et al. | 340/825.69 |
| 4,866,434 | 9/1989 | Keenan | 340/825.69 |
| 4,999,622 | 3/1991 | Amano et al. | 340/825.72 |

FOREIGN PATENT DOCUMENTS

| | | |
|---|---|---|
| 0203668 | 12/1986 | European Pat. Off. . |
| 0223307 | 5/1987 | European Pat. Off. . |
| 331 257 A2 | 2/1989 | European Pat. Off. . |
| 335 742 A2 | 8/1989 | European Pat. Off. . |
| 2136177 | 9/1984 | United Kingdom . |
| 2226905 | 7/1990 | United Kingdom . |

*Primary Examiner*—Michael Horabik

*Attorney, Agent, or Firm*—Sughrue, Mion, Zinn, Macpeak and Seas

[57] ABSTRACT

A remote controlling method including the steps of storing the remote controller code of respective television brands in a first memory of a transmission IC, checking the input of dual keys for appliance brand selection to access the remote controller code data previously stored in the first memory, setting a data format and carrier dividing ratio according to the selected remote controller code data after the access operation so as to output them as channel-up data, storing the selected remote controller data in a second memory if the dual key input is released during the channel-up data output, and transmitting data suitable for the selected remote controller code with respect to a key input after the data storage.

7 Claims, 2 Drawing Sheets

REMOTE CONTROLLING METHOD

FIELD OF THE INVENTION

The present invention relates to a multi-purpose remote controller, and more particularly to a method for remote-controlling different-brand televisions and video tape recorders (VTRs).

BACKGROUND OF THE INVENTION

Remote controllers are often used for the exclusive operation of a TV or VTR, and therefore manipulating both the TV and the VTR requires two remote controllers. A remote controller is known which is capable of simultaneously manipulating both a TV and a VTR; however, such a remote controller can simultaneously operate only a TV and a VTR which have been made by the same manufacturer. It is not possible for different brands of manufacturer of VTRs and TVs to be manipulated by such a single remote controller. Each of the TV and VTR can be controlled by its corresponding remote controller, but cannot be controlled by a different-brand remote controller. In other words, in order to simultaneously operate a VTR and a TV with one remote controller, the VTR and TV must be of the same manufacturer.

SUMMARY OF THE INVENTION

Therefore, it is an object of the present invention to provide a remote controlling method in which a TV remote controller code for each brand is stored in a remote controller and a user simply selects a brand to compatibly control a VTR and a TV of different makes by using one remote controller.

It is another object to the present invention to provide a remote controlling method in which main key data on remote controllers of respective TV manufacturers are stored therein and, when a brand is selected by the remote controller's key, key data corresponding to the key input is output so as to control different brand TVs and VTRs using a single remote controller.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
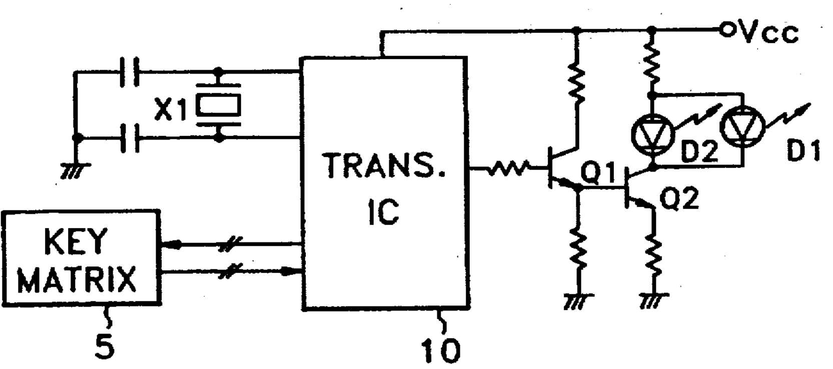
FIG. 1 shows a block circuit diagram of a remote controller to which the remote controlling method according to the present invention is applied.

FIG. 1 shows a remote controller. As shown in FIG. 1, the remote controller includes a key matrix 5, a transmitting IC 10, infrared-emitting diodes $D_1$ and $D_2$, transistors $Q_1$ and $Q_2$, and an oscillation device $X_1$.

Referring to FIG. 1, the oscillation output from the oscillation device $X_1$ is supplied to transmitting IC 10 which inspects the key input from key matrix 5 and generates an output signal according to the key input. Transistors $Q_1$ and $Q_2$ are driven by the output signal from transmitting IC 10 and the infrared-emitting diodes $D_1$ and $D_2$ are in turn driven to emit infrared light.

The construction of the remote controller in FIG. 1 is the same as that of remote controllers known in the art.

Figure 2:
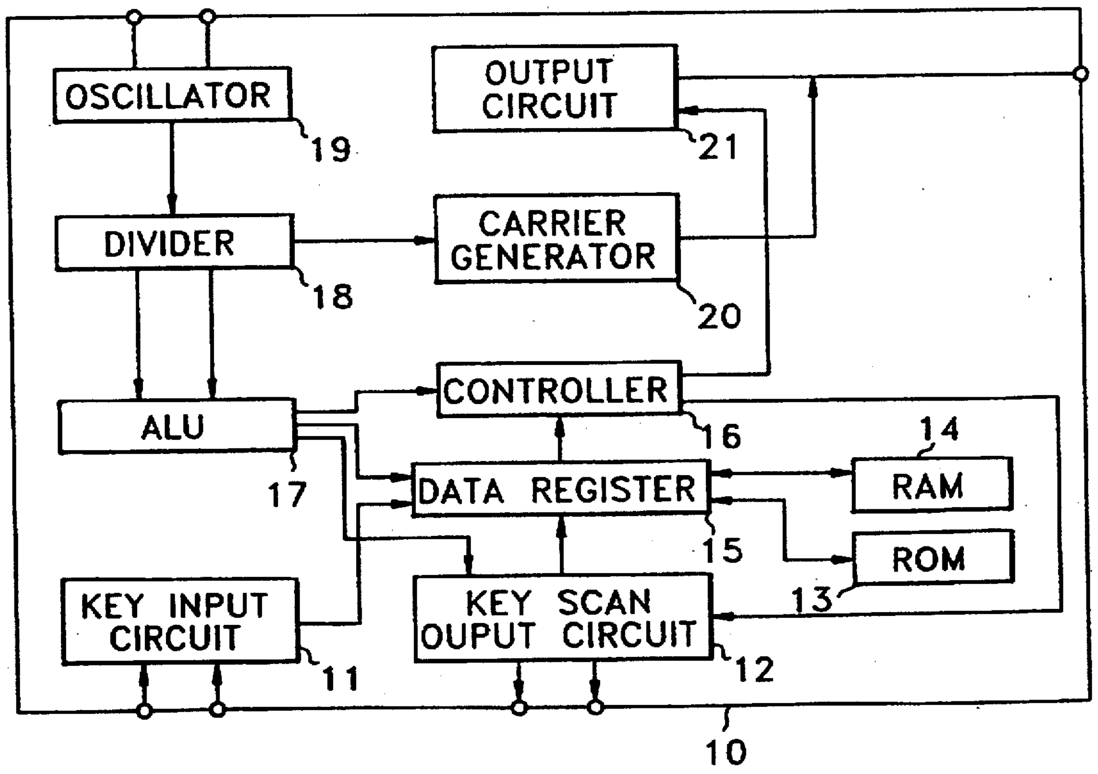
FIG. 2 is a block diagram of the transmitting IC of FIG. 1.

FIG. 2 shows the transmitting IC 10 of the remote controller of FIG. 1 in greater detail. The transmitting IC 10 comprises a key input circuit 11, a key scan output circuit 12, a ROM 13 having data required for the operation of the present invention stored therein, a RAM 14 storing the data set by a key input, a data register 15, a controller 16 for controlling the system, an arithmetic logic unit 17, a divider 18, an oscillator 19, a carrier generator 20, and an output circuit 21. These circuits are well-known in the art and therefore their operations will not be described.

The remote controlling method of the present invention is designed to store main key data from each brand of remote controller in transmitting IC 10 of the instant remote controller, so as to select key data of a respective brand according to the key input from key matrix 5, and to generate key input data suitable for the selected brand.

Figure 3:
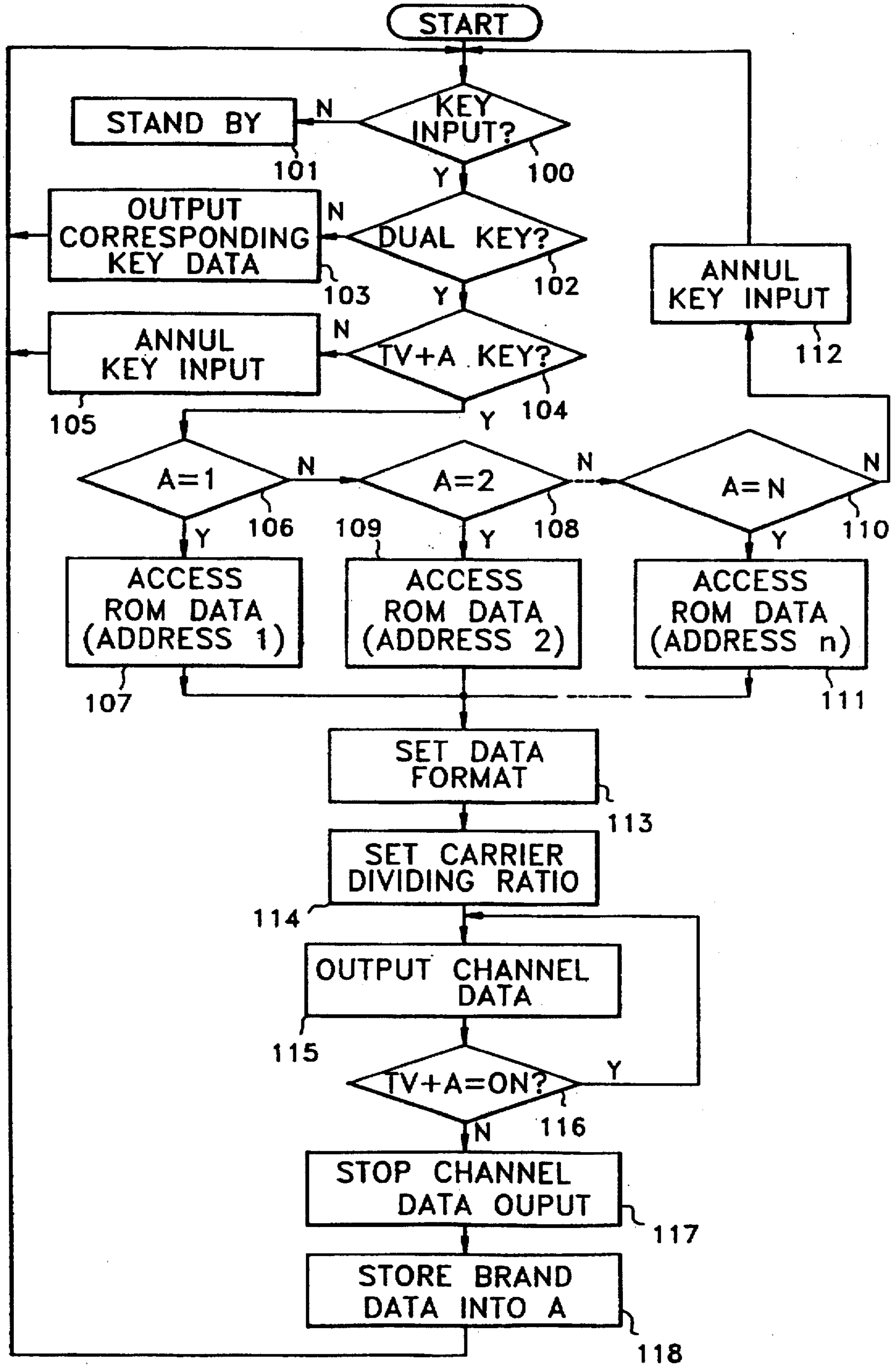
FIG. 3 is a flowchart for illustrating a remote controlling method of the present invention.

The operation of the present invention will now be described below in detail with reference to FIG. 3.

First, it is assumed that a specific TV brand is selected by simultaneously pressing a TV key and a numeral key (hereinafter referred to as "A") of key matrix 5, and the remote controller code of brand X and the remote controller code of brand Y are stored in the ROM at address locations A=1 and A=2, respectively. The remote controller code of brand X has a 37.9 KHz carrier, 32 data bits, a data dividing ratio of 24, and a 910 KHz oscillation frequency. Brand X's data structure is custom code+$\overline{\text{custom code}}$+data+$\overline{\text{data}}$, and its channel data is 21 (hexadecimal). The remote controller code of brand Y has a 56.8 KHz carrier, 24 data bits, a data dividing ratio of 16, and a 910 KHz oscillation frequency. Brand Y's data construction is custom code+data+$\overline{\text{custom code}}$+$\overline{\text{data}}$, and its channel data is D2 (hexadecimal).

The method by which the remote controller code of brand X or brand Y is selected using the TV and A key (A=1 or 2) while the remote controller codes of different brands are stored in the remote controller, will now be described.

First, using key scan input, step 100 decides whether or not a key is pressed in key matrix 5. If a key is not pressed, step 101 executes a stand-by mode to minimize power consumption. If a key is pressed, step 102 decides whether or not the key input indicates a dual key input, meaning two keys are simultaneously being pressed. If the key input is not a dual key input, step 103 generates corresponding key input data and returns to step 100. If the key input is a dual key input, step 104 determines whether or not the dual key input is the TV and A keys. (A is the brand select designating key.) If the key input is not the TV and A keys, step 105 annuls the key input and returns. If the key input is the TV and A keys, data stored in ROM 13 is accessed according to the value of the A key. In other words, when the key input is the TV and A keys, if the A value is 1 in step 106, step 107 accesses address 1 from the data stored in ROM 13, and if the A value is 2, step 109 accesses address 2 from the data stored in ROM 13. In this example, the remote controller code of brand X is stored in address 1 and the remote controller code of brand Y is stored in address 2. Potential A values may be determined by the number n of TV brands in use, as shown in steps 110 and 111. As shown in step 112, if a TV and an A key are simultaneously depressed (step 104), and the A key does not correspond to a designated number n (steps 106, 108, 110), then step 112 annuls the key input and the method returns to step 100.

The data stored in each address of ROM 13 includes the remote controller's output data format, dividing ratio according to a carrier frequency, and custom code key data for each brand TV. Therefore, steps 113 and 114 set the data format and carrier dividing ratio using the data stored in each address according to the A value.

Step 115 outputs the set channel data in order to test the remote controller with the set data format, and to determine whether the set data format in the remote controller is correct. In other words, if among the TV and A keys, the A value is 1, the data format is set to 32 bits and the carrier dividing ratio is set to 24 (910 KHz/24=37.9 KHz). If the A value is 2, the data format is set to 24 bits and the carrier dividing ratio is set to 16 (910 KHz/16=56.8 KHz). Channel data is output as 21 (hexadecimal) if A is 1, and output as D2 (hexadecimal) if A is 2.

If the user determines that the channel of the desired-brand TV has changed as a result of the channel data output in step 115, then the user releases the TV and A key in step 116. That is, the user would know that the channel data is correct.

When the TV and A keys are not released (i.e., the TV and A keys are continously depressed), channel data is continuously output. That is, if in step 116, the user continues to depress the TV and A keys, then the method returns to step 115 and channel data is continuously output. If the TV and A keys are released, step 117 stops the output of the channel-up data, and step 118 stores the brand data for the particular television into the RAM 14, finishing the brand selection.

When the TV brand is selected, the infrared carrier frequency and transmission data format are determined by the selected brand's mode, and after this process, suitable key input data is transmitted to operate any brand of television.

In other words, after the TV and A keys are simultaneously pressed, and correct data (corresponding to the device's brand) is retrieved from ROM 13 (the correct data being confirmed by No in step 116), if a key is then pressed, infrared carrier frequency and transmission data format suitable for the selected brand's mode are provided to transmit key input data, thereby operating any television and VTR with one remote controller.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A remote controlling method comprising the steps of:

pre-storing remote controller data codes of respective appliance brands in a ROM of a transmission IC;

checking for operation of dual keys indicative of appliance brand selection to thereby access one of the remote controller data codes previously stored in the ROM and produce a selected remote controller data code;

setting a data format and a carrier dividing ratio according to the selected remote controller data code so as to output the set data format and carrier dividing ratio as channel data;

storing said selected remote controller data in a RAM when said duel key input is released during the output of the channel data; and transmitting after said storing step, data suitable for the selected remote controller code in response to a key input after said data storage.

2. The remote controlling method as claimed in claim 1, wherein said dual keys indicative of appliance brand selection comprise two designated keys of a keypad.

3. A method of remote controlling a particular brand appliance, said method comprising the steps of:

(a) pre-storing a plurality of remote controller data codes, each of said remote controller data codes corressponding to a different brand appliance, in a remote controller;

(b) determining whether two designated keys of the remote controller are being simultaneously activated, wherein one of said designated keys corresponds to the respective particular brand appliance;

(c) accessing, when said determining step (b) determines that the two designated keys are being simultaneously activated, one of remote controller data codes which is associated with the one of said designated keys; and (d) transmitting data corresponding to the accessed one of said remote controller data codes to thereby control the particular brand appliance.

4. The method as defined in claim 3, further comprising the step of:

(e) setting a data format and a carrier dividing ratio according to the accessed one of said remote controller data codes, wherein the data transmitted during a step (d) corresponds to the set data format and carrier dividing ratio.

5. The method as defined in claim 4, further comprising the step of (f) storing the data controlling the particular brand appliance.

6. The method as defined in claim 5, wherein said data stored in step (f), which corresponds to the particular brand appliance, is transmitted after activation of a preset key.

7. The method as defined in claim 6, wherein activation of the preset key occurs after step (b).

* * * * *